(12) United States Patent
Tsuji

(10) Patent No.: US 12,372,351 B2
(45) Date of Patent: Jul. 29, 2025

(54) ABNORMALITY DETECTION SYSTEM, ABNORMALITY DETECTION METHOD, AND COMPUTER READABLE MEDIUM

(71) Applicant: NEC Corporation, Tokyo (JP)

(72) Inventor: Akira Tsuji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 354 days.

(21) Appl. No.: 18/023,896

(22) PCT Filed: Sep. 9, 2020

(86) PCT No.: PCT/JP2020/034058
§ 371 (c)(1),
(2) Date: Feb. 28, 2023

(87) PCT Pub. No.: WO2022/054158
PCT Pub. Date: Mar. 17, 2022

(65) Prior Publication Data
US 2023/0332887 A1    Oct. 19, 2023

(51) Int. Cl.
*G01B 21/30* (2006.01)
*G01B 21/32* (2006.01)

(52) U.S. Cl.
CPC ............ *G01B 21/30* (2013.01); *G01B 21/32* (2013.01)

(58) Field of Classification Search
CPC ...... G01B 21/30; G01B 21/32; G01B 11/303; G01B 11/2518
See application file for complete search history.

(56) References Cited

U.S. PATENT DOCUMENTS

| | | | |
|---|---|---|---|
| 7,392,692 B2 * | 7/2008 | Noda ................. | G01B 5/008 73/104 |
| 11,766,246 B2 * | 9/2023 | Ebata ................. | A61B 8/469 33/700 |

(Continued)

FOREIGN PATENT DOCUMENTS

| | | | | |
|---|---|---|---|---|
| EP | 4047603 A1 * | 8/2022 | .......... | G01M 99/008 |
| EP | 4170600 A1 * | 4/2023 | ............ | G06V 10/22 |

(Continued)

OTHER PUBLICATIONS

International Search Report for PCT Application No. PCT/JP2020/034058, mailed on Dec. 1, 2020.

(Continued)

*Primary Examiner* — Yaritza Guadalupe-McCall
(74) *Attorney, Agent, or Firm* — Sughrue Mion, PLLC

(57) ABSTRACT

An abnormality detection system includes: shape data acquisition means for acquiring shape data of a surface of a structure; reference shape calculation means for calculating a reference shape for the shape data acquired by the shape data acquisition means; abnormality candidate extraction means for extracting an abnormality candidate area of the surface based on a difference between the reference shape calculated by the reference shape calculation means and the shape data corresponding to the reference shape; degree of roughness calculation means for calculating a degree of roughness of the abnormality candidate area extracted by the abnormality candidate extraction means and an area near the extracted abnormality candidate area; and abnormality determination means for determining that there is an abnormality in an area where the degree of roughness calculated by the roughness calculation means exceeds a threshold among the abnormality candidate areas extracted by the abnormality candidate extraction means.

7 Claims, 7 Drawing Sheets

(56) References Cited

U.S. PATENT DOCUMENTS

| | | | | |
|---|---|---|---|---|
| 2019/0154806 A1* | 5/2019 | Zweigle | ................. | G06T 7/521 |
| 2020/0380802 A1* | 12/2020 | Mori | ..................... | B60W 40/10 |
| 2022/0301140 A1* | 9/2022 | Kawamura | ............ | G06F 18/22 |
| 2023/0332887 A1* | 10/2023 | Tsuji | ..................... | G01B 21/30 |
| 2023/0332977 A1* | 10/2023 | Tsuji | .................. | G01M 5/0033 |
| 2024/0403705 A1* | 12/2024 | Kawamura | ............ | G06N 20/00 |

FOREIGN PATENT DOCUMENTS

| | | | | |
|---|---|---|---|---|
| EP | 4471676 A1 * | 12/2024 | ............ | G06N 20/00 |
| JP | 2015-031018 A | 2/2015 | | |
| JP | 2017-162452 A | 9/2017 | | |
| JP | 2019-117188 A | 7/2019 | | |
| JP | 6664569 B1 | 3/2020 | | |
| WO | WO-2021152685 A1 * | 8/2021 | .......... | G01M 99/005 |
| WO | WO-2022054163 A1 * | 3/2022 | .......... | G01M 5/0025 |

OTHER PUBLICATIONS

Written opinion for PCT Application No. PCT/JP2020/034058, mailed on Dec. 1, 2020.

* cited by examiner

ABNORMALITY DETECTION SYSTEM, ABNORMALITY DETECTION METHOD, AND COMPUTER READABLE MEDIUM

This application is a National Stage Entry of PCT/JP2020/034058 filed on Sep. 9, 2020, the contents of all of which are incorporated herein by reference, in their entirety.

TECHNICAL FIELD

The present invention relates to an abnormality detection system, an abnormality detection method, and a computer readable medium that detect abnormalities of a structure.

BACKGROUND ART

Abnormality detection systems that detect abnormalities on the surface of a structure by acquiring shape data of the surface of the structure and comparing the acquired shape data with a reference shape corresponding to the shape data are known (see Patent Literature 1 and 2).

CITATION LIST

Patent Literature

Patent Literature 1: Japanese Unexamined Patent Application Publication No. 2019-117188
Patent Literature 2: Japanese Patent No. 6664569

SUMMARY OF INVENTION

Technical Problem

Incidentally, for example, a structure such as an arch part of a tunnel has various cross-sectional shapes as shown in FIG. 7, and is not necessarily curved at a constant curvature. Therefore, an error between shape data and a reference shape becomes large depending on a change in curvature of the surface of the structure, and there is thus a possibility that abnormalities on the surface of the structure will be erroneously detected.

An object of the present disclosure is to provide an abnormality detection system, an abnormality detection method, and a computer readable medium that solve at least one of the above-described problems.

Solution to Problem

In order to achieve the above-described object, an example aspect is an abnormality detection system including:
  shape data acquisition means for acquiring shape data of a surface of a structure;
  reference shape calculation means for calculating a reference shape for the shape data acquired by the shape data acquisition means;
  abnormality candidate extraction means for extracting an abnormality candidate area of the surface based on a difference between the reference shape calculated by the reference shape calculation means and the shape data corresponding to the reference shape;
  degree of roughness calculation means for calculating a degree of roughness of the abnormality candidate area extracted by the abnormality candidate extraction means and an area near the extracted abnormality candidate area; and
  abnormality determination means for determining that there is an abnormality in an area where the degree of roughness calculated by the roughness calculation means exceeds a threshold among the abnormality candidate areas extracted by the abnormality candidate extraction means.

In order to achieve the above-described object, an example aspect may be an abnormality detection method including:
  acquiring shape data of a surface of a structure;
  calculating a reference shape for the acquired shape data;
  extracting an abnormality candidate area of the surface based on a difference between the calculated reference shape and the shape data corresponding to the reference shape;
  calculating a degree of roughness of the extracted abnormality candidate area and an area near the extracted abnormality candidate area; and
  determining that there is an abnormality in an area where the calculated degree of roughness exceeds a threshold among the extracted abnormality candidate areas.

In order to achieve the above-described object, an example aspect may be a non-transitory computer readable medium storing a program for causing a computer to perform:
  a process of acquiring shape data of a surface of a structure;
  a process of calculating a reference shape for the acquired shape data;
  a process of extracting an abnormality candidate area of the surface based on a difference between the calculated reference shape and the shape data corresponding to the reference shape;
  a process of calculating a degree of roughness of the extracted abnormality candidate area and an area near the extracted abnormality candidate area; and
  a process of determining that there is an abnormality in an area where the calculated degree of roughness exceeds a threshold among the extracted abnormality candidate areas.

Advantageous Effects of Invention

According to the present disclosure, it is possible to provide an abnormality detection system, an abnormality detection method, and a computer readable medium that solve at least one of the above-described problems.

EXAMPLE EMBODIMENT

Example embodiments according to the present invention will be described hereinafter with reference to the drawings. An abnormality detection system according to this example embodiment detects deterioration abnormalities such as collapses, honeycombs, cracks, and the like that occur on the surface of a structure such as a tunnel, a road, a bridge, and a building.

Figure 1:
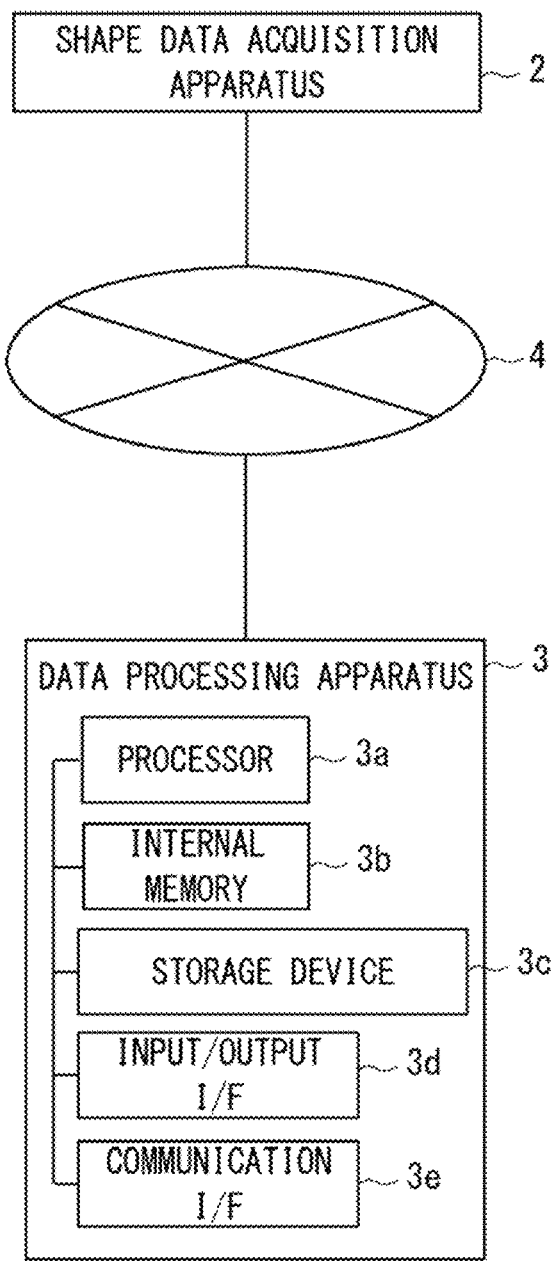
FIG. 1 is a block diagram showing a schematic system configuration of an abnormality detection system according to an example embodiment.

FIG. 1 is a block diagram showing a schematic system configuration of the abnormality detection system according to this example embodiment. An abnormality detection system 1 according to this example embodiment includes a shape data acquisition apparatus 2 and a data processing apparatus 3. The shape data acquisition apparatus 2 may be connected to the data processing apparatus 3 for communication through a communication network 4 such as a Wide Area Network (WAN) or a Local Area Network (LAN). The shape data acquisition apparatus 2 and the data processing apparatus 3 may be integrally formed.

The shape data acquisition apparatus 2 is a specific example of shape data acquisition means. The shape data acquisition apparatus 2 acquires shape data of the wall surface of a structure. The shape data of the structure is three-dimensional point cloud data showing the shape of, for example, the inner wall surface of a tunnel.

The shape data acquisition apparatus 2 is configured as an optical sensor such as a LiDAR (Light Detection and Ranging) and a laser scanner. The LiDAR can measure the distance between the shape data acquisition apparatus 2 and the wall surface of a structure or specify the property of the wall surface of the structure by, for example, scanning and irradiating the wall surface of the structure with a laser beam to observe scattered light and reflected light. The shape data acquisition apparatus 2 may acquire shape data of a structure stored in advance in a storage device or the like. The shape data acquisition apparatus 2 transmits the acquired shape data to the data processing apparatus 3.

The data processing apparatus 3 has, for example, a hardware configuration of a normal computer including a processor $3a$ such as a Central Processing Unit (CPU) or a Graphics Processing Unit (GPU), an internal memory $3b$ such as a Random Access Memory (RAM) and a Read Only Memory (ROM), a storage device $3c$ such as a Hard Disk Drive (HDD) or a Solid State Drive (SDD), an input/output I/F $3d$ for connecting a peripheral device such as a display, and a communication I/F $3e$ for communicating with a device located outside the data processing apparatus.

By the data processing apparatus 3, it is possible to implement the function of each unit described later by, for example, having the processor $3a$ execute a program stored in the storage device $3c$, the internal memory $3b$, or the like while using the internal memory $3b$.

Figure 2:
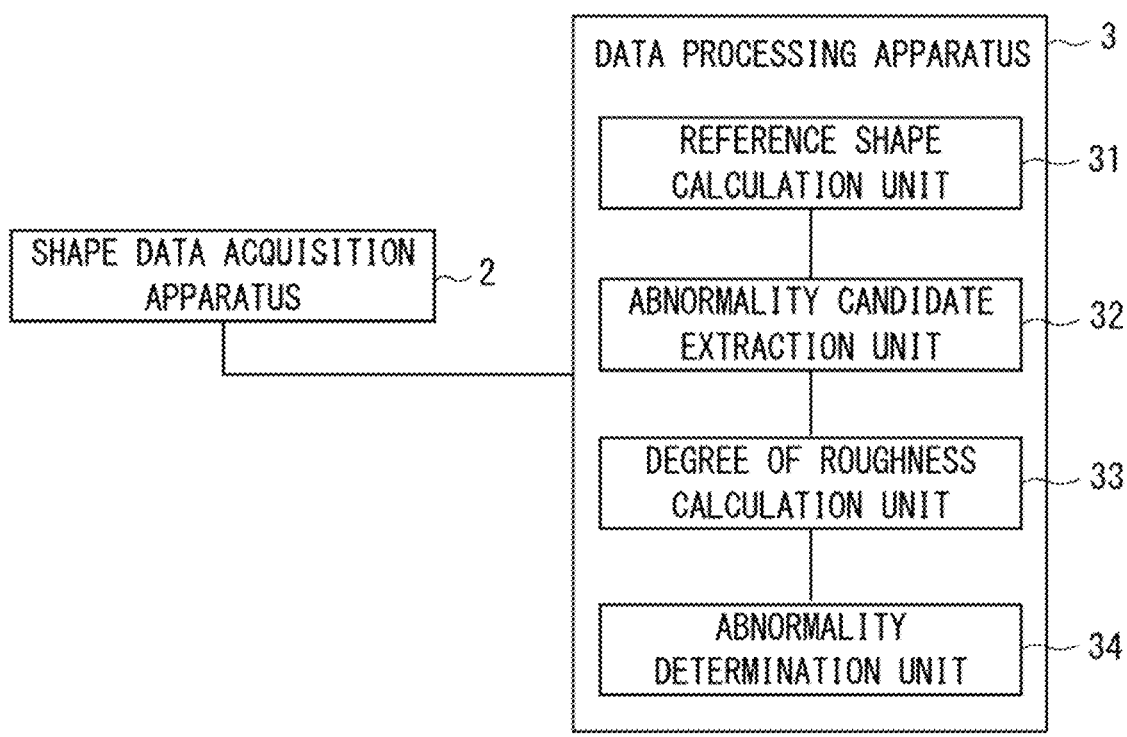
FIG. 2 is a block diagram showing a schematic system configuration of a data processing apparatus according to the example embodiment.

FIG. 2 is a block diagram showing a schematic system configuration of the data processing apparatus according to this example embodiment. The data processing apparatus 3 according to this example embodiment includes a reference shape calculation unit 31 that calculates a reference shape, an abnormality candidate extraction unit 32 that extracts an abnormality candidate, a degree of roughness calculation unit 33 that calculates a degree of roughness of the abnormality candidate, and an abnormality determination unit 34 that determines whether or not the abnormality candidate has an abnormality.

The reference shape calculation unit 31 is a specific example of reference shape calculation means. The reference shape calculation unit 31 calculates a reference shape for the shape data acquired by the shape data acquisition apparatus 2. The reference shape calculation unit 31 calculates, as the reference shape, an approximate plane or an approximate curved surface for the shape data acquired by the shape data acquisition apparatus 2.

The reference shape calculation unit 31 may calculate, as the reference shape, an approximate straight line or an approximate curve for the shape data acquired by the shape data acquisition apparatus 2. For example, the reference shape calculation unit 31 projects a three-dimensional point cloud of the shape data onto a plane and calculates an approximate straight line or an approximate curve of the projected point cloud.

More specifically, among the three-dimensional point clouds included in the shape data, the reference shape calculation unit 31 projects a three-dimensional point cloud present within a set distance from an orthogonal plane, which is a plane perpendicular to a tunnel axis direction, onto the orthogonal plane, and performs straight line approximation or curve approximation on the projected point cloud.

Further, the reference shape calculation unit 31 may calculate the reference shape as an approximate expression as follows. For example, it is assumed that shape data is point cloud data of the inner wall surface of a tunnel. First, it is preferable that the reference shape calculation unit 31 generate point cloud data of an arch part of the tunnel, which data is obtained by excluding point cloud data of a bottom surface part of the tunnel from point cloud data of the tunnel. This is because the arch part and the bottom surface part of the tunnel are not continuously formed, and thus an error is likely to occur in a part connecting the arch part of the tunnel to the bottom surface part of the tunnel.

The reference shape calculation unit 31 can generate point cloud data of the arch part of the tunnel based on the direction of a normal vector, coordinate values of the point cloud, and the like. The reference shape calculation unit 31 calculates a distance from the shape data acquisition apparatus 2 to each point included in the generated point cloud data of the shape data.

The reference shape calculation unit 31 divides the point cloud data into small pieces in the axial direction of the tunnel, for example, at predetermined intervals such as 1 cm or 5 cm in the vertical direction. The reference shape calculation unit 31 calculates an average value of the distances from the shape data acquisition apparatus 2 to each of the points included in the divided point cloud of each area in which the coordinates in the vertical direction are approximately the same.

This is because when the point cloud data is divided in the vertical direction (in the Y-axis direction), a plurality of points having approximately the same Y-coordinate values are present. Note that, instead of the average value of the distances from the shape data acquisition apparatus 2 to each of the above-mentioned points, the reference shape calculation unit 31 may calculate an intermediate value of the distance or the like as a representative value.

Figure 3:
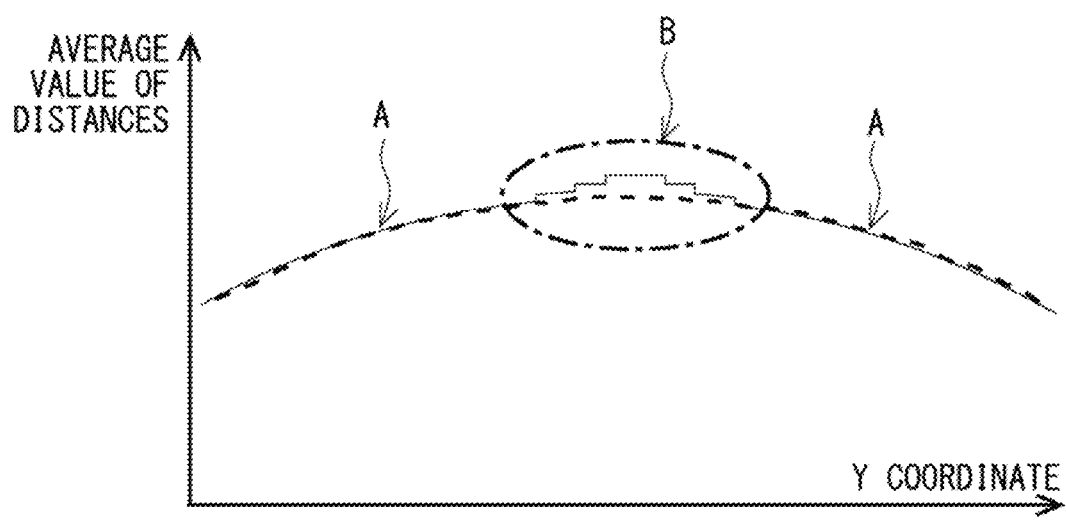
FIG. 3 is a diagram showing an example of a graph showing a relation between coordinates of each point in a vertical direction and a calculated average value of distances from a shape data acquisition apparatus to each of the points.

The reference shape calculation unit 31 generates a graph showing a relation between the coordinates of each point in the vertical direction and the calculated average value of the distances from the shape data acquisition apparatus 2 to each of the above-mentioned points. FIG. 3 is a diagram showing an example of the graph showing the relation between the coordinates of each point in the vertical direction and the calculated average value of the distances from the shape data acquisition apparatus 2 to each of the above-mentioned points.

In this graph, the horizontal axis is defined as a coordinate (Y coordinate value) in the vertical direction and the vertical axis is defined as an average value of the distances from the shape data acquisition apparatus 2 to each of the above-mentioned points. In the generated graph, the reference shape calculation unit 31 calculates an approximate expression for the real data line showing the change in the average value of the distances from the shape data acquisition apparatus 2 to each of the above-mentioned points as the reference shape. In FIG. 3, the real data line is indicated by a solid line, and the line of the approximate expression is indicated by a dotted line.

The abnormality candidate extraction unit 32 is a specific example of abnormality candidate extraction means. The abnormality candidate extraction unit 32 detects an abnormality candidate area of shape data based on a difference between shape data acquired by the shape data acquisition apparatus and the reference shape corresponding to shape data calculated by the reference shape calculation unit 31.

The abnormality candidate extraction unit 32 calculates the above difference using, for example, a least squares method, and extracts an abnormality candidate area of shape data. The abnormality candidate extraction unit 32 calculates a least square error of the shape data acquired by the shape data acquisition apparatus and the reference shape corresponding to the shape data calculated by the reference shape calculation unit 31. The abnormality candidate extraction unit 32 extracts an area of the shape data where the calculated least squares error exceeds a threshold as an abnormality candidate area.

For example, as shown in FIG. 3, the abnormality candidate extraction unit 32 calculates a difference between the approximate expression of the graph calculated by the reference shape calculation unit 31 and the real data line. The abnormality candidate extraction unit 32 extracts an area of the shape data where the calculated difference becomes positive and exceeds a threshold as an abnormality candidate area.

As shown in A in FIG. 3, the distance from the shape data acquisition apparatus 2 to the arch part of the tunnel changes gradually when there is no abnormality, such as a collapse, in the arch part. On the other hand, as shown in B in FIG. 3, when the wall surface of the arch part is peeled off or chipped due to a collapse etc., the value of the real data line becomes larger than that of the approximate expression.

Note that although the reference shape calculation unit 31 generates a graph using the distance from the shape data acquisition apparatus 2 to each of the points and then calculates an approximate expression as described above, the present disclosure is not limited thereto. The reference shape calculation unit 31 may generate a graph using a reflected luminance value and then calculate an approximate expression instead of using the distance from the shape data acquisition apparatus 2 to each of the points.

After that, like in the above case, the abnormality candidate extraction unit 32 calculates a difference between the approximate expression of the graph calculated by the reference shape calculation unit 31 and the real data line. The abnormality candidate extraction unit 32 extracts an area of the shape data where the calculated difference becomes positive and exceeds a threshold as an abnormality candidate area. As described above, by using the reflected luminance value instead of using the distance when an approximate shape is calculated, it is possible not only to detect an abnormality, such as a collapse, in which a shape changes, but also to detect an abnormality, such as a crack, in which a shape does not change greatly and a luminance changes.

The reflected luminance value is acquired by a light sensor, such as a LiDAR. The reflected luminance value is reduced as the distance from the shape data acquisition apparatus 2 to the point increases. Therefore, it is not desirable to divide point cloud data in the same direction as a beam irradiation direction of the shape data acquisition apparatus 2, while it is desirable to divide point cloud data in a direction perpendicular to the beam irradiation direction.

The degree of roughness calculation unit 33 is a specific example of degree of roughness calculation means. The degree of roughness calculation unit 33 calculates a degree of roughness of a surface of each abnormality candidate area extracted by the abnormality candidate extraction unit 32 and an area near the extracted abnormality candidate area. Note that the degree of roughness calculation unit 33 calculates a degree of roughness of the surface including not only the abnormality candidate area but also the area near the abnormality candidate area, whereby it also can accurately calculate the degree of roughness of the surface of an end part of the abnormality candidate area.

The degree of roughness calculation unit 33 calculates, for example, a degree of roughness of the surface of an area within a predetermined range from a point of interest including the abnormality candidate area and an area near the abnormality candidate area. The predetermined range may be set experimentally or based on point density (point intervals) of LiDAR etc.

The degree of roughness calculation unit 33 calculates, for example, a surface roughness (Ra, Rz, Rms, etc.), a rate of change of a normal vector, and a curvature distribution in each abnormality candidate area and an area near the abnormality candidate area as a degree of roughness of the surface.

The abnormality determination unit 34 is a specific example of abnormality determination means. The abnormality determination unit 34 determines that there is an abnormality in an area where the degree of roughness of the surface calculated by the degree of roughness calculation unit 33 exceeds a threshold among the abnormality candidate areas extracted by the abnormality candidate extraction unit 32.

Figure 7:
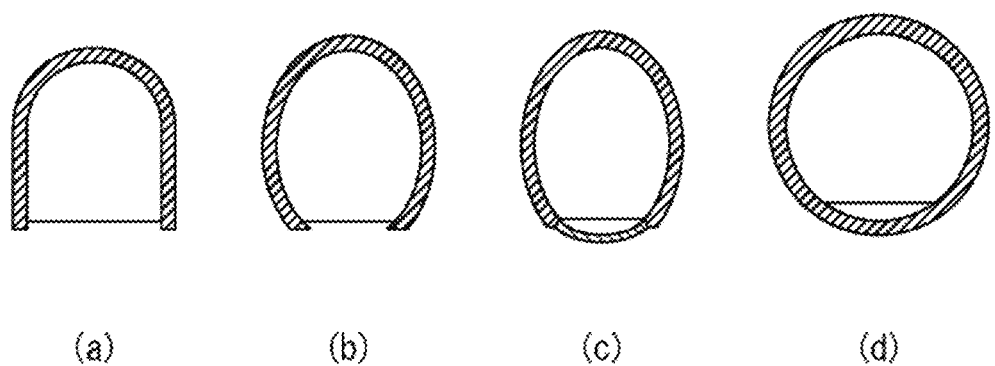
FIG. 7 is a diagram showing a cross-sectional shape of the arch part of the tunnel.

Incidentally, for example, a structure such as an arch part of a tunnel has various cross-sectional shapes as shown in FIG. 7, and is not necessarily curved at a constant curvature. Therefore, an error between shape data and a reference shape becomes large depending on a change in curvature of the surface of the structure, and there is thus a possibility that abnormalities on the surface of the structure will be erroneously detected.

In order to address the above problem, in the abnormality detection system 1 according to this example embodiment, as described above, the abnormality candidate extraction unit 32 extracts an abnormality candidate area of shape data based on a difference between shape data acquired by the shape data acquisition apparatus and a reference shape corresponding to the shape data. Further, the abnormality determination unit 34 determines that there is an abnormality in an area where the degree of roughness of the surface thereof exceeds a threshold among the abnormality candidate areas extracted by the abnormality candidate extraction unit 32.

According to this example embodiment, as described above, at a first stage, an abnormality candidate area is extracted based on a difference between the shape data and the reference shape, and at a second stage, it is then determined by the degree of roughness of the surface of the extracted abnormality candidate area whether or not there is an abnormality on the surface. By the above two-stage abnormality determination, it is possible to reduce the occurrence of erroneous detection of abnormalities on the surface of the structure.

Figure 4:
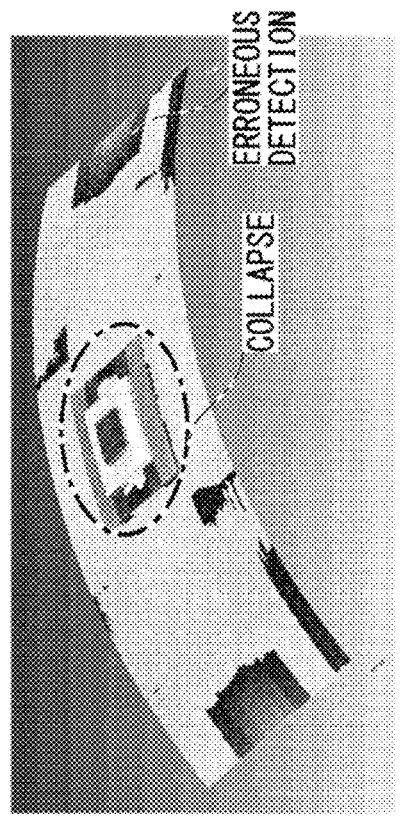
FIG. 4 is a diagram showing a comparison between a result of detection of an abnormality in an arch part of a tunnel by the abnormality detection system according to the example embodiment and a result of detection of an abnormality in the arch part of the tunnel by an abnormality detection system according to a related art.
Figure 4:
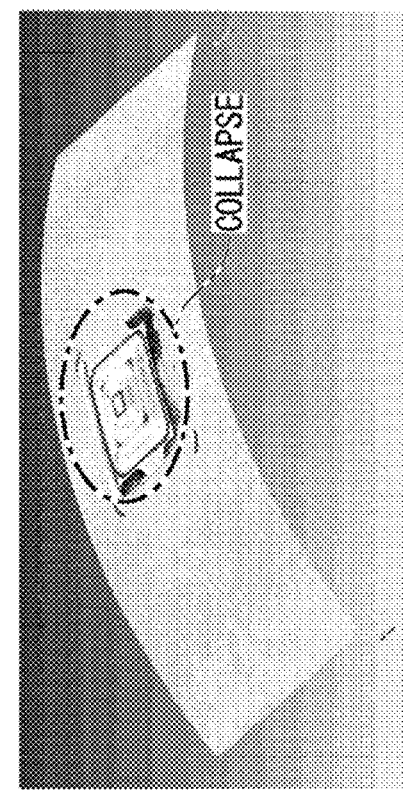

FIG. 4 is a diagram showing a comparison between a result of detection of an abnormality in an arch part of a tunnel by the abnormality detection system according to this example embodiment and a result of detection of an abnormality in the arch part of the tunnel by an abnormality detection system according to a related art.

As shown in FIG. 4(*a*), although the abnormality detection system according to the related art has correctly detected a collapse of the ceiling surface of the arch part as an abnormality, it has erroneously detected an area of the ceiling surface of the arch part where a gap, which is caused by an arch shape, has been generated as an abnormality. On the other hand, as shown in FIG. 4(*b*), the abnormality detection system 1 according to this example embodiment has detected only the collapse of the ceiling surface of the arch part by extracting the abnormality candidate area and then determining the degree of roughness of this area.

Figure 5:
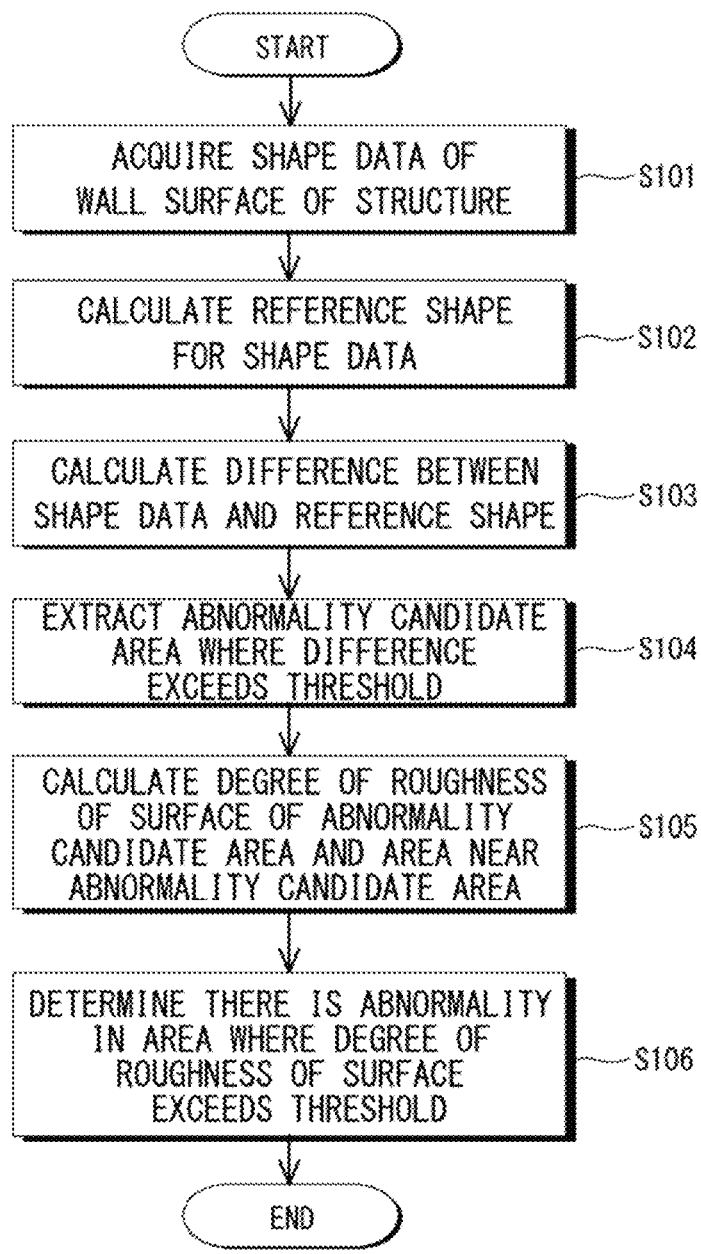
FIG. 5 is a flowchart showing an example of a flow of an abnormality detection method according to the example embodiment.

Next, an abnormality detection method according to this example embodiment will be described. FIG. 5 is a flowchart showing an example of a flow of the abnormality detection method according to this example embodiment.

The shape data acquisition apparatus 2 acquires shape data of the wall surface of a structure (Step S101). The shape data acquisition apparatus 2 transmits the acquired shape data to the data processing apparatus 3.

The reference shape calculation unit 31 of the data processing apparatus 3 calculates a reference shape for the shape data acquired by the shape data acquisition apparatus 2 (Step S102). The reference shape calculation unit 31 transmits the calculated reference shape for the shape data to the abnormality candidate extraction unit 32.

The abnormality candidate extraction unit 32 calculates a difference between the shape data acquired by the shape data acquisition apparatus 2 and the reference shape corresponding to the shape data calculated by the reference shape calculation unit 31 (Step S103). The abnormality candidate extraction unit 32 extracts the abnormality candidate area where the calculated difference becomes positive and exceeds a threshold and transmits it to the degree of roughness calculation unit 33 (Step S104).

The degree of roughness calculation unit 33 calculates a degree of roughness of a surface of each abnormality candidate area extracted by the abnormality candidate extraction unit 32 and an area near the extracted abnormality candidate area (Step S105). The degree of roughness calculation unit 33 transmits the calculated degree of roughness of the surface to the abnormality determination unit 34.

The abnormality determination unit 34 determines that there is an abnormality in an area where the degree of roughness of the surface calculated by the degree of roughness calculation unit 33 exceeds a threshold among the abnormality candidate areas extracted by the abnormality candidate extraction unit 32 (Step S106).

Note that, in the above example embodiment, although a case has been described in which the abnormality detection system 1 detects abnormalities such as collapse that occur on the inner wall surface of a tunnel, the abnormality detection system 1 can similarly detect deterioration abnormalities that occur on the surface of a structure such as a road, a bridge, and a building.

As described above, the abnormality detection system according to this example embodiment includes a shape data acquisition unit that acquires shape data of a surface of a structure, the reference shape calculation unit 31 that calculates a reference shape for the shape data acquired by the shape data acquisition unit, the abnormality candidate extraction unit 32 that extracts an abnormality candidate area of the surface of the structure based on a difference between the reference shape calculated by the reference shape calculation unit 31 and the shape data corresponding to the reference shape, the degree of roughness calculation unit 33 that calculates a degree of roughness of the abnormality candidate area extracted by the abnormality candidate extraction unit 32 and an area near the extracted abnormality candidate area, and the abnormality determination unit 34 that determines that there is an abnormality in an area where the degree of roughness of the surface calculated by the degree of roughness calculation unit 33 exceeds a threshold among the abnormality candidate areas extracted by the abnormality candidate extraction unit 32. By the above configuration, the abnormality candidate area is extracted based on a difference between the shape data and the reference shape, and then it is determined by the degree of roughness of the surface of the extracted abnormality candidate area whether or not there is an abnormality on the surface. Thus, it is possible to reduce the occurrence of erroneous detection of abnormalities on the surface of the structure.

SECOND EXAMPLE EMBODIMENT

In this example embodiment, the abnormality determination unit 34 detects, in each abnormal area in which it has determined there is an abnormality, a size of the abnormality. The abnormality determination unit 34 can calculate a size of the abnormality by performing a Principal Component Analysis on the point cloud of each abnormal area in which it has determined there is an abnormality and calculating a spread of the point cloud in the three-dimensional space.

In the Principal Component Analysis, the eigenvector of the principal component is defined as the direction of the axis and the eigenvalue of the principal component is defined as the variance, and the XYZ axes are defined as a first principal component, a second principal component, and a third principal component in order from the axis having the largest variance.

For example, the abnormality determination unit 34 clusters the abnormal area in which it has determined there is an abnormality. Next, the abnormality determination unit 34 calculates directions of the XYZ coordinate axes along the distribution of the point cloud by performing the Principal Component Analysis for each cluster obtained by clustering of the abnormal area.

Figure 6:
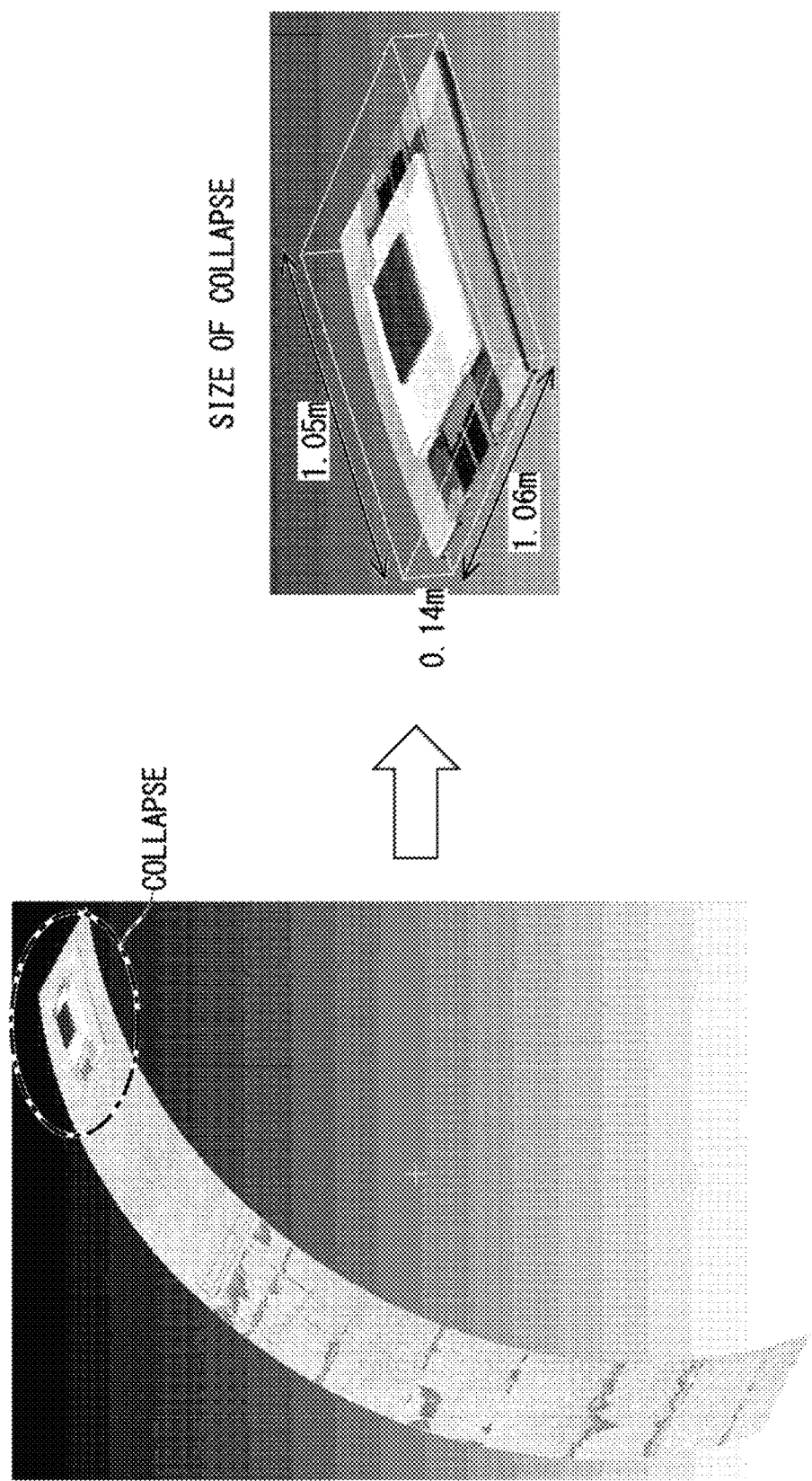
FIG. 6 is a diagram showing a size of a collapse of the inner wall surface of a tunnel in the three-dimensional direction.

The abnormality determination unit 34 calculates a size of the abnormality by calculating maximum and minimum values of the point cloud in each direction on the newly calculated XYZ coordinate axes. By doing so, it is possible, for example, as shown in FIG. 6, not only to detect a collapse of the inner wall surface of the tunnel but also to accurately detect the size (length: 1.06 m, width: 1.05 m, height: 0.14 m, etc.) of the collapse in the three-dimensional direction.

Several novel example embodiments according to the present invention have been described above. However, these example embodiments are merely presented as examples and are not intended to limit the scope of the invention. These novel example embodiments can be implemented in various forms. Further, their components/structures may be omitted, replaced, or modified without departing from the scope and the spirit of the invention. These example embodiments and modifications thereof are included in the scope and the spirit of the invention and also included in the invention specified in the claims and the scope equivalent thereto.

In the present invention, for example, the processes shown in FIG. 5 can also be implemented by causing a processor to execute a computer program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.).

The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Each of the units composing the data processing apparatus 3 according to any of the above-described example embodiments is, in addition to being able to be implemented by the program, able to be partially or entirely implemented by dedicated hardware such as an Application Specific Integrated Circuit (ASIC) or a Field-Programmable Gate Array (FPGA).

REFERENCE SIGNS LIST

1 ABNORMALITY DETECTION SYSTEM
2 SHAPE DATA ACQUISITION APPARATUS
3 DATA PROCESSING APPARATUS
4 COMMUNICATION NETWORK
31 REFERENCE SHAPE CALCULATION UNIT
32 ABNORMALITY CANDIDATE EXTRACTION UNIT
33 DEGREE OF ROUGHNESS CALCULATION UNIT
34 ABNORMALITY DETERMINATION UNIT

What is claimed is:

1. An abnormality detection system comprising:
a processor programmed to function as:
shape data acquisition means for acquiring shape data of a surface of a structure;
reference shape calculation means for calculating a reference shape for the shape data acquired by the shape data acquisition means;
abnormality candidate extraction means for extracting an abnormality candidate area of the surface based on a difference between the reference shape calculated by the reference shape calculation means and the shape data corresponding to the reference shape;
degree of roughness calculation means for calculating a degree of roughness of the abnormality candidate area extracted by the abnormality candidate extraction means and an area near the extracted abnormality candidate area; and
abnormality determination means for determining that there is an abnormality in an area where the degree of roughness calculated by the roughness calculation means exceeds a threshold among the abnormality candidate areas extracted by the abnormality candidate extraction means.

2. The abnormality detection system according to claim 1, wherein the reference shape calculation means calculates at least one of an approximate plane, an approximate curved surface, an approximate straight line, and an approximate curve for the shape data acquired by the shape data acquisition means as the reference shape.

3. The abnormality detection system according to claim 1, wherein the abnormality candidate extraction means calculates a least square error of the shape data acquired by the shape data acquisition means and the reference shape corresponding to the shape data calculated by the reference shape calculation means, and extracts an area of the shape data where the calculated least square error exceeds a threshold as the abnormality candidate area.

4. The abnormality detection system according to claim 1, wherein the degree of roughness calculation means calculates, as the degree of roughness of the surface, a surface roughness, a rate of change of a normal vector, or a curvature distribution in the abnormality candidate area extracted by the abnormality candidate extraction means and the area near the extracted abnormality candidate area.

5. The abnormality detection system according to claim 1, wherein the abnormality determination means calculates a size of the abnormality by performing a principal component analysis on a point cloud of the abnormality candidate area where it has determined that there is an abnormality and calculating a spread of the point cloud in a three-dimensional space.

6. An abnormality detection method comprising:
acquiring shape data of a surface of a structure;
calculating a reference shape for the acquired shape data;
extracting an abnormality candidate area of the surface based on a difference between the calculated reference shape and the shape data corresponding to the reference shape;
calculating a degree of roughness of the extracted abnormality candidate area and an area near the extracted abnormality candidate area; and
determining that there is an abnormality in an area where the calculated degree of roughness exceeds a threshold among the extracted abnormality candidate areas.

7. A non-transitory computer readable medium storing a program for causing a computer to perform:
a process of acquiring shape data of a surface of a structure;
a process of calculating a reference shape for the acquired shape data;
a process of extracting an abnormality candidate area of the surface based on a difference between the calculated reference shape and the shape data corresponding to the reference shape;
a process of calculating a degree of roughness of the extracted abnormality candidate area and an area near the extracted abnormality candidate area; and a process of determining that there is an abnormality in an area where the calculated degree of roughness exceeds a threshold among the extracted abnormality candidate areas.

\* \* \* \* \*